United States Patent [19]
Arimilli et al.

[11] Patent Number: 5,958,011
[45] Date of Patent: Sep. 28, 1999

[54] SYSTEM UTILIZING MASTERING AND SNOOPING CIRCUITRY THAT OPERATE IN RESPONSE TO CLOCK SIGNALS HAVING DIFFERENT FREQUENCIES GENERATED BY THE COMMUNICATION CONTROLLER

[75] Inventors: Ravi Kumar Arimilli, Austin; Jerry Don Lewis, Round Rock, both of Tex.

[73] Assignee: International Business Machines Corporation, Armonk, N.Y.

[21] Appl. No.: 08/829,579

[22] Filed: Mar. 31, 1997

[51] Int. Cl.⁶ .............................. G06F 13/14; G06F 11/30
[52] U.S. Cl. ............................... 709/224; 709/8; 710/29; 710/60; 713/600; 713/501
[58] Field of Search .................................... 395/835, 677, 395/849, 880, 555, 556, 200.54, 559; 710/15, 29, 60; 709/8, 224; 713/500, 501, 600

[56] References Cited

U.S. PATENT DOCUMENTS

| | | | |
|---|---|---|---|
| 3,623,017 | 11/1971 | Lowell et al. | 340/172.5 |
| 4,680,781 | 7/1987 | Amundson et al. | 375/8 |
| 4,819,164 | 4/1989 | Branson | 364/200 |
| 4,931,924 | 6/1990 | Kageura | 364/200 |
| 5,109,490 | 4/1992 | Arimilli et al. | 395/325 |
| 5,237,676 | 8/1993 | Arimilli et al. | 395/550 |
| 5,291,588 | 3/1994 | Kohtz et al. | 395/550 |
| 5,319,771 | 6/1994 | Takeda | 395/550 |
| 5,471,587 | 11/1995 | Fernando | 395/309 |
| 5,491,814 | 2/1996 | Yee et al. | 395/550 |
| 5,526,512 | 6/1996 | Arimilli et al. | 395/473 |
| 5,553,276 | 9/1996 | Dean | 395/550 |
| 5,625,806 | 4/1997 | Kromer | 395/556 |
| 5,628,001 | 5/1997 | Cepuran | 395/556 |
| 5,689,660 | 11/1997 | Johnson et al. | 395/309 |
| 5,774,700 | 6/1998 | Fisch et al. | 395/555 |
| 5,774,703 | 6/1998 | Weiss et al. | 395/556 |
| 5,784,599 | 7/1998 | Elkhoury | 395/556 |

*Primary Examiner*—Thomas C. Lee
*Assistant Examiner*—Rehana Perveen
*Attorney, Agent, or Firm*—Richard A. Henkler; Brian F. Russell; Andrew J. Dillion

[57] ABSTRACT

A data processing system and method of communicating data in a data processing system are described. The data processing system includes a communication network to which a plurality of devices are coupled. At least one device among the plurality of devices coupled to the communication network includes mastering circuitry and snooping circuitry. According to the method, a first timing signal having a first frequency and a second timing signal having a second frequency different from the first frequency are generated. Communication transactions on the communication network are initiated utilizing the mastering circuitry, which operates in response to the first timing signal, and are monitored utilizing the snooping circuitry, which operates in response to the second timing signal.

14 Claims, 4 Drawing Sheets

SYSTEM UTILIZING MASTERING AND SNOOPING CIRCUITRY THAT OPERATE IN RESPONSE TO CLOCK SIGNALS HAVING DIFFERENT FREQUENCIES GENERATED BY THE COMMUNICATION CONTROLLER

BACKGROUND OF THE INVENTION

1. Technical Field

The present invention relates in general to a method and system for data communication in a data processing system and in particular to method and system for data communication across a shared communication network in a data processing system. Still more particularly, the present invention relates to a method and system for data communication across a shared communication network that permit the timing of mastering and snooping operations to be controlled independently.

2. Description of the Related Art

A multiprocessor data processing system typically includes a shared system bus to which a number of processors and other devices (e.g., memory and adapters) are coupled. In such multiprocessor data processing systems, devices frequently need to communicate tasks, data, interrupts, and other information to other devices across the shared system bus. Accordingly, each device may include a bus interface unit (BIU) to manage communication across the shared system bus in conformance with a predetermined bus communication protocol.

The bus communication protocol implemented by each BIU can be viewed as a state machine including a first set of states corresponding to mastering operations and a second set of states corresponding to snooping operations. The timing of state transitions in the bus communication protocol state machine is controlled by a functional signal, which in conventional data processing systems has a fixed frequency that is lower than the system clock frequency by a fixed ratio, for example, 4:1. Thus, if the system clock frequency is 300 MHz, the functional signal frequency is 75 MHz.

In conventional bus communication protocols, mastering and snooping states typically have a fixed timing relationship. For example, a BIU may launch data on the shared system bus (a mastering operation) and then wait four functional signal cycles to latch data from the shared system bus (a snooping operation). Because the timing of mastering and snooping operations are linked by the bus communication protocol state machine and because the functional signal has a fixed frequency, bus communication timing in prior art data processing systems is relatively rigid and does not afford a large amount of flexibility in controlling the flow of communication transactions across the shared system bus. The limited flexibility in bus communication timing also restricts the implementation of the shared system bus to configurations that support the timing requirements dictated by the selected bus communication protocol.

As should thus be apparent, it would be desirable to provide a method and system for bus communication that permit greater flexibility in system bus design. In addition, it would be desirable to provide a method and system for bus communication that permit the timing of mastering and snooping operations to be controlled independently.

SUMMARY OF THE INVENTION

It is therefore one object of the present invention to provide a method and system for data communication in a data processing system.

It is another object of the present invention to provide a method and system for data communication across a shared communication network within a data processing system.

It is yet another object of the present invention to provide a method and system for data communication across a shared communication network that permit the timing of mastering and snooping operations to be controlled independently.

The foregoing objects are achieved as is now described. A data processing system and method of communicating data in a data processing system are provided. The data processing system includes a communication network to which a plurality of devices are coupled. At least one device among the plurality of devices coupled to the communication network includes mastering circuitry and snooping circuitry. According to the method, a first timing signal having a first frequency and a second timing signal having a second frequency different from the first frequency are generated. Communication transactions on the communication network are initiated utilizing the mastering circuitry, which operates in response to the first timing signal, and are monitored utilizing the snooping circuitry, which operates in response to the second timing signal.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
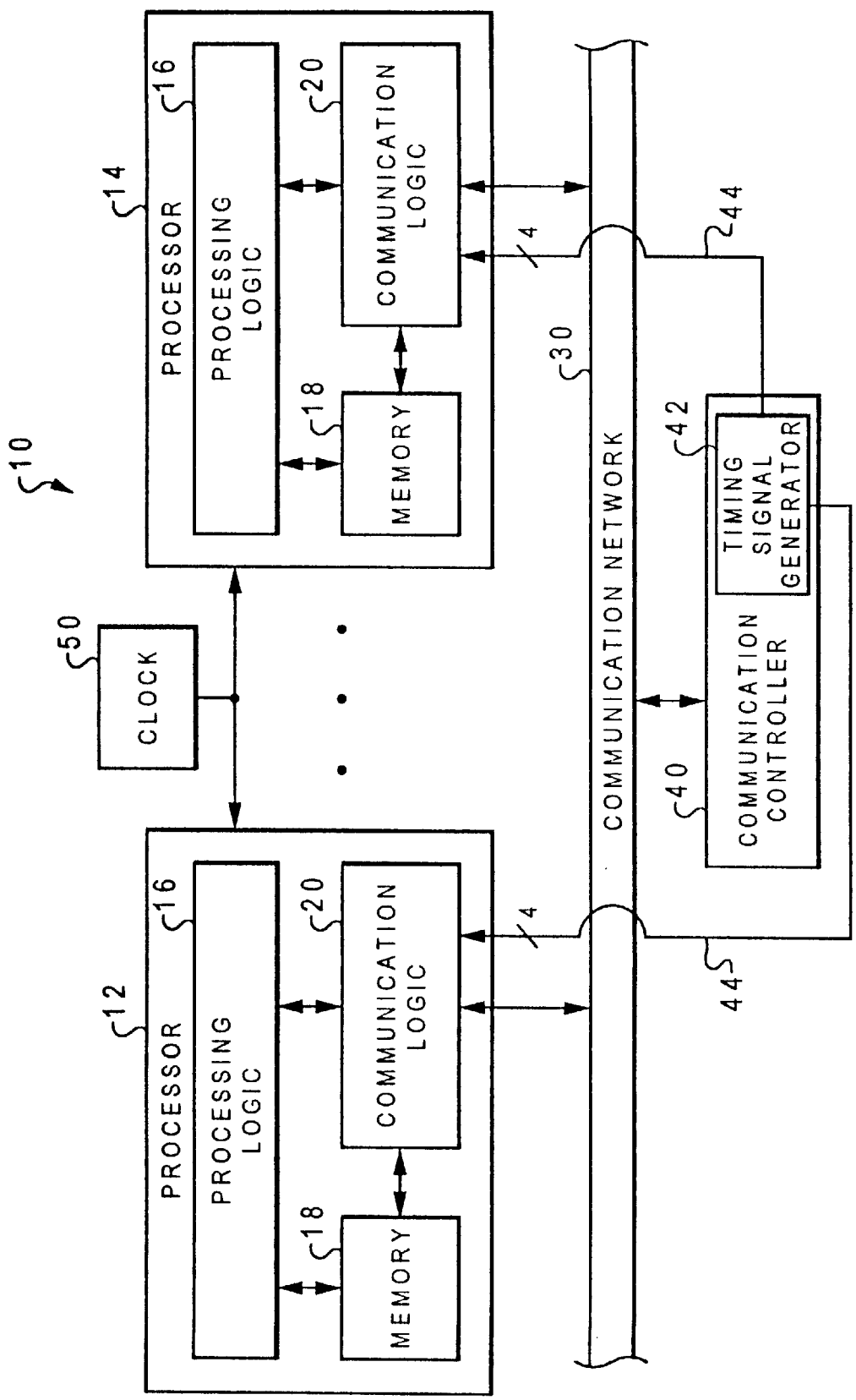
FIG. 1 depicts an illustrative embodiment of a data processing system in accordance with the present invention.

With reference now to the figures and in particular with reference to FIG. 1, there is illustrated a multiprocessor data processing system with which the present invention may advantageously be utilized. As depicted, data processing system 10 includes processors 12 and 14, as well as additional unillustrated devices represented by ellipsis notation, which are all coupled to communication network 30. Processors 12 and 14, which both operate in response to fixed-frequency clock 50, each include processing logic 16, which comprises circuitry for processing instructions and data. Local storage for instructions and data is provided by memory 18, which may include one or more register files and one or more levels of cache memory. Each of processors 12 and 14 further includes communication logic 20, which is coupled to communication network 30 in order to permit communication of threads, interrupts, data, and other information between processors 12 and 14 and other devices that may optionally be coupled to communication network 30.

The physical structure of communication network 30 is implementation-specific and may depend upon numerous factors, such as the number of devices coupled to communication network 30 and the desired communication bandwidth and performance. For example, in an embodiment of the present invention in which data processing system 10 comprises a workstation such as the RS/6000, available from International Business Machines Corporation (IBM), communication network 30 may comprise a shared system bus. In alternative embodiments of the present invention, communication network 30 may comprise an Application Specific Integrated Circuit (ASIC) chipset to which each device is coupled for point-to-point communication.

As illustrated in FIG. 1, communication across communication network 30 is managed by communication controller 40. As will be appreciated by persons skilled in the computer arts, the logic within communication controller 40 utilized to manage communication on communication network 30 is necessarily dependent upon the implementation of communication network 30 and may include, for example, arbitration logic and other control circuitry. Regardless of the implementation of communication network 30, communication controller 40 includes a timing signal generator 42 that generates timing signals 44, four of which are coupled to communication logic 20 within processor 12 and four of which are coupled to communication logic 20 within processor 14. Timing signals 44 have independently selectable frequencies and duty cycles, which are set by communication controller 40. In accordance with an important aspect of the present invention and as discussed in detail below, communication logic 20 within each of processors 12 and 14 performs communication transactions on communication network 30 at a rate determined by the selectable frequency of its respective timing signals 44.

Figure 2:
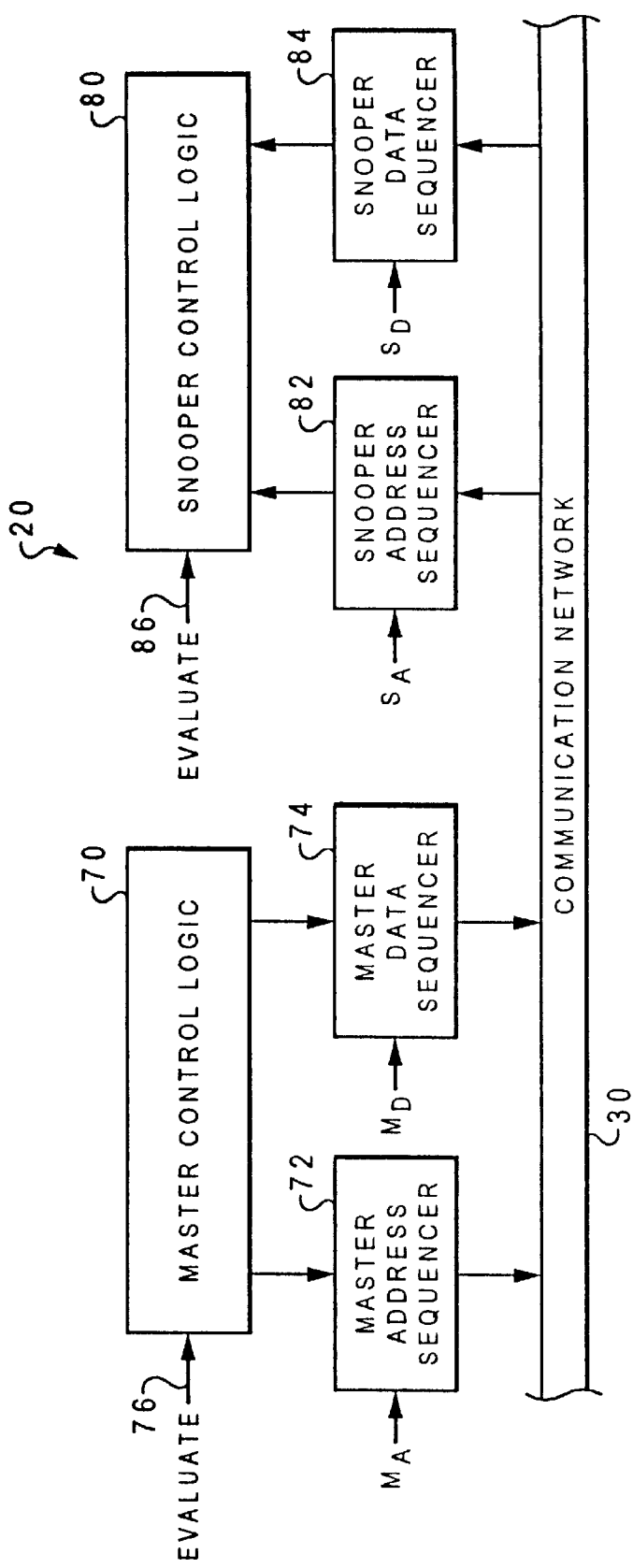
FIG. 2 illustrates a more detailed block diagram representation of the communication logic illustrated in FIG. 1.

Referring now to FIG. 2, there is depicted a more detailed block diagram representation of communication logic 20 in each of processors 12 and 14. As illustrated, communication logic 20 includes master circuitry, comprising master control logic 70, master address sequencer 72, and master data sequencer 74. Master control logic 70 initiates (launches) transactions on communication network 30 in accordance with a selected communication protocol, such as the 6xx bus protocol developed by IBM. Accordingly, in response to receipt of a request to initiate a communication transaction on communication network 30, master control logic 70 asserts the appropriate control signals to signify the initiation of a bus transaction. For example, in an embodiment of the present invention in which communication network 30 comprises a shared system bus, master control logic 70 asserts address and data bus request signals in response to receipt of a store request from processing logic 16. Master control logic 70 then passes the address and data, if any, associated with the communication transaction to master address sequencer 72 and master data sequencer 74, respectively. Although individual logic gates within master control logic 70 are clocked by the clock signal generated by clock 50 (as are all of the logic gates within processors 12 and 14), transitions between states of the communication protocol state machine implemented by master control logic 70 are made in response to evaluate signal 76, which is described in greater detail below with reference to FIGS. 3, 4A and 4B.

In response to receipt of an address and data from master control logic 70, master address and data sequencers 72 and 74 drive the address and data associated with the communication transaction on communication network 30 in response to $m_A$ and $m_D$, respectively, which are two of timing signals 44.

As is further illustrated in FIG. 2, communication logic 20 also includes a snooper comprising snooper control logic 80, snooper address sequencer 82, and snooper data sequencer 84. Snooper control logic 80 monitors communication transactions on communication network 30 and identifies transactions addressed to the processor containing communication logic 20, for example, by examining transaction or processor IDs. In response to detection of a communication transaction addressed to the associated one of processors 12 and 14, snooper control logic 80 causes snooper address sequencer 82 and snooper data sequencer 84 to latch the address and data, respectively, associated with the communication transaction. Similar to master address and data sequencers 72 and 74, snooper address and data sequencers 82 and 84 latch the address and data from communication network 30 in response to timing signals $s_A$ and $s_D$, respectively, which are two of timing signals 44. Addresses and data latched from communication network 30 by snooper address and data sequencers 82 and 84 are passed to snooper control logic 80, which thereafter processes the addresses and data in accordance with the communication protocol. As discussed above with respect to master control logic 70, snooper control logic 80 makes transitions between states in the communication protocol in response to evaluate signal 86.

As noted above, each of timing signals 44 generated by communication controller 40 has a selectable frequency that can be set independently of all other timing signals 44. The ability of communication controller 40 to individually control the operation of each of sequencers 72, 74, 82, and 84 within each of processors 12 and 14 (as well as in other devices coupled to communication network 30) provides numerous advantages over prior art systems in which all devices coupled to a shared system bus operate at a fixed frequency ratio with respect to the processor clock frequency.

First, communication controller 40 can set the frequency of all timing signals 44 transmitted to devices participating in a particular communication transaction to the highest frequency supported by all devices participating in the communication transaction. Thus, the rate of communication is not constrained by the slowest device coupled to communication network 30, but is rather determined by the slowest device participating within an individual communication transaction.

Second, communication controller 40 can individually set each of timing signals 44 to its own unique frequency. Thus, communication controller 40 can cause each of sequencers 72, 74, 82, and 84 in each of processors 12 and 14 to operate at a different rate. This capability permits absolute control of the time between the launch of an address by master address sequencer 72 in one of processors 12 and 14 and the latching of the address by snooper address sequencer 82 in the other of processors 12 and 14. Similarly, communication controller 40 has complete control over the interval between the launch of data by master data sequencer 74 in one of processors 12 and 14 and the latching of data by snooper data sequencer 84 in the other of processors 12 and 14. In addition, communication controller 40 can control the relative timing of the launch of address and data by master address and data sequencers 72 and 74.

This precise control of the timing of data and address communication within each communication transaction gives great freedom in the design of communication network 30. For example, instead of implementing communication network 30 as a conventional shared system bus, communication network 30 can be implemented with an ASIC chipset that permit point-to-point communication. In this point-to-point implementation, multiple devices can simultaneously launch addresses and data onto communication network 30, thereby improving overall communication throughput. Importantly, by controlling communication transaction timings, the present invention enables such alternative embodiments of communication network 30 to be implemented without any modification to the selected communication protocol.

Controlling communication transaction timings utilizing communication controller 40 also permits increased freedom in the manner communication transactions are prioritized. For example, in an embodiment of the present invention in which communication network 30 comprises a shared system bus and in which all communication transactions are tagged with an ID, communication controller 40 can permit a first device to begin a first communication transaction, then permit a higher priority device to "interrupt" the first communication transaction with a second communication transaction, and thereafter permit the first device to resume the first communication transaction. Communication controller 40 can suspend the first communication transaction in this manner simply by maintaining the appropriate timing signals in the inactive state until the second communication transaction is complete.

Figure 3:
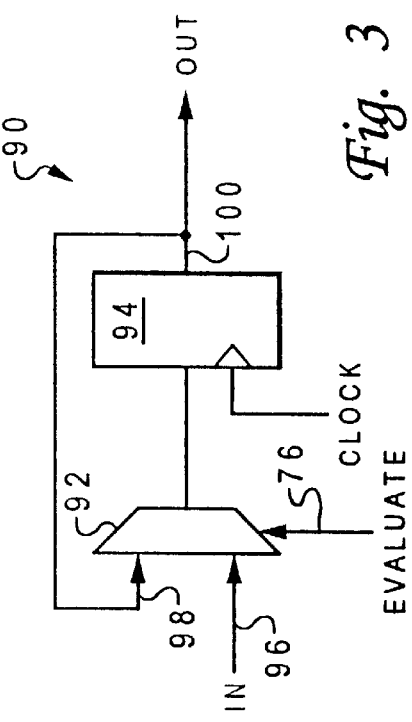
FIG. 3 depicts an illustrative embodiment of a latch-and-hold circuit within the master control logic depicted in FIG. 2.

With reference now to FIG. 3, there is depicted an illustrative embodiment of a latch-and-hold circuit within master control logic 70. As depicted, latch-and-hold circuit 90 comprises multiplexer 92 and latch 94. Multiplexer 92 has a data input 96 and a feedback input 98, which is coupled to latch output 100. Multiplexer 92 selects the data presented at data input 96 as an output if evaluate signal 76 is active and selects the data presented at feedback input 98 as an output if evaluate signal 76 is inactive. Snooper control logic 80 includes one or more similarly configured latch-and-hold circuits that operate in response to evaluate signal 86.

According to an important aspect of the present invention, evaluate signals 76 and 86, which ordinarily have a lower frequency than clock 50, for example, by a 2:1 ratio, can selectively alternate between active and inactive states at the frequency of clock 50. As described below with reference to FIGS. 4A and 4B, selective evaluation of particular latches within master control logic 70 and snooper control logic 80 at the frequency of clock 50 permits states in the communication protocol state machine to be rapidly traversed when such states are independent of the timing of communication transactions on communication network 30.

Figure 4A:
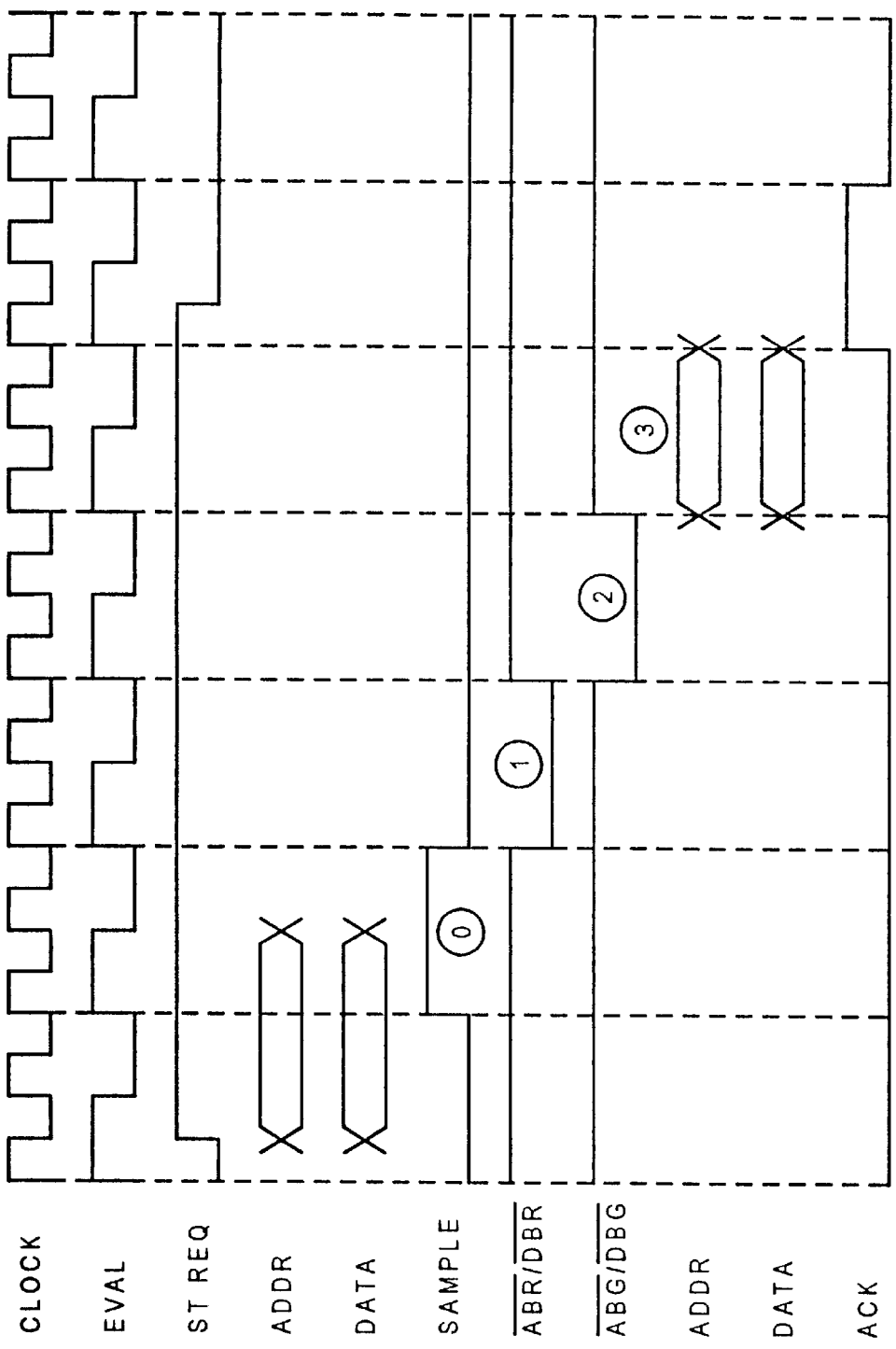
FIGS. 4A and 4B are timing diagrams illustrating the communication efficiency that results from selectively operating portions of the communication logic at processor clock frequency.

Referring now to FIG. 4A, there is depicted a timing diagram illustrating the timing of a store operation in a conventional processor having a fixed 2:1 ratio between the processor clock frequency and the communication logic evaluation signal. As illustrated, the store operation is initiated when a store request (ST REQ) is asserted in conjunction with an address and data. In response to a detection of the store request, communication logic within the processor samples the address and data at the next rising edge of the evaluation signal following the assertion of the store request. As illustrated in FIG. 4A, sampling the address and data driven by the processing logic corresponds to state 0 of the communication protocol implemented by the communication logic.

After sampling the address and data, the communication logic makes a transition to state 1 at the next rising edge of the evaluation signal. In state 1, the communication logic asserts an address bus request (ABR) and a data bus request (DBR). The communication logic then changes from state 1 to state 2 at the next rising edge of the evaluation signal in response to receipt of an address bus grant (ABG) and a data bus grant (DBG). Next, the communication logic makes a transition to state 3 at the next rising edge of the evaluation signal and drives the address and data received on the shared system bus. Thereafter, in response to receipt of an acknowledgement signal, the store request is removed.

Figure 4B:
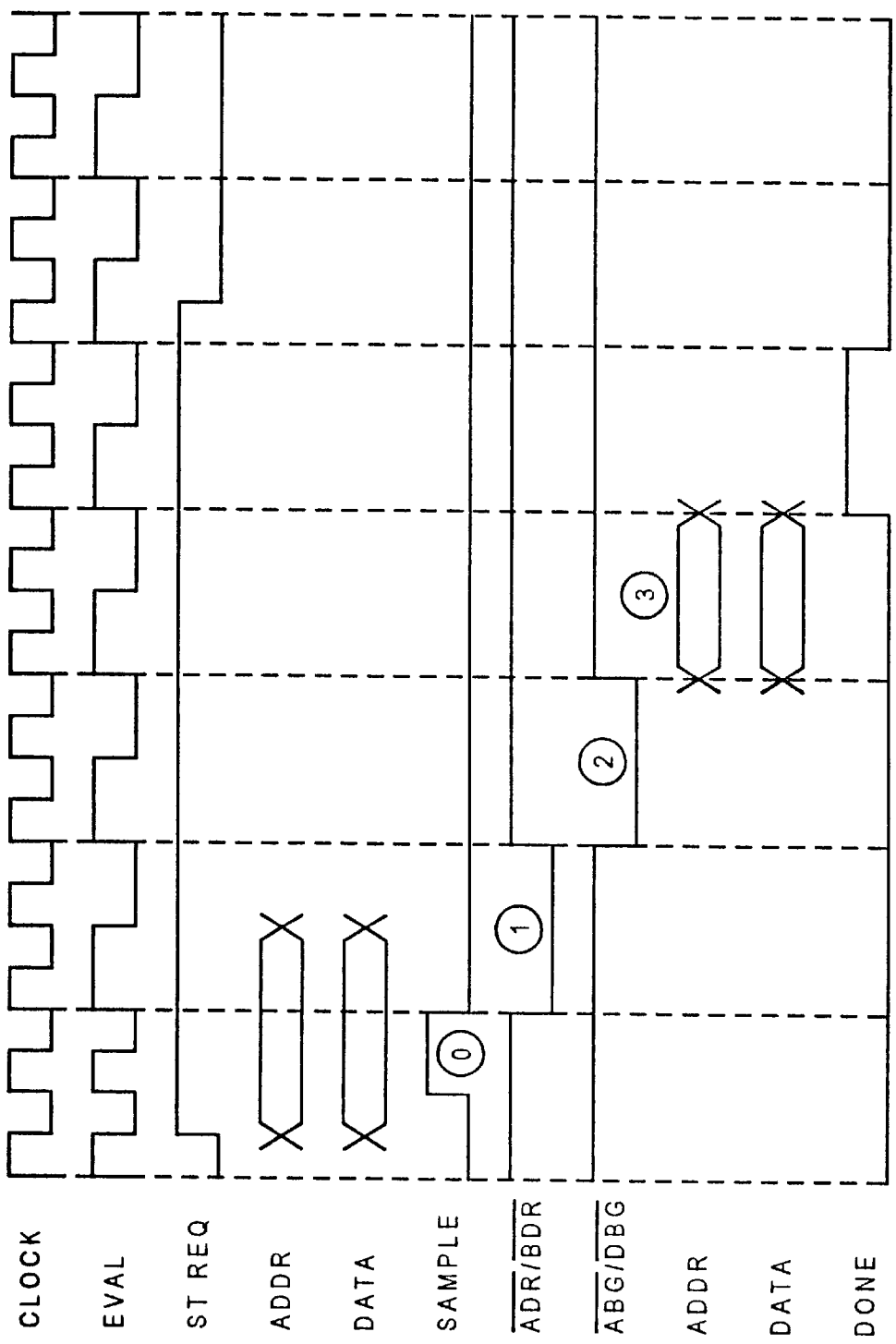

Referring now to FIG. 4B, there is depicted a timing diagram of a similar store operation in accordance with the present invention. In accordance with an important aspect of the present invention, logic within master control logic 70 and snooper control logic 80 that does not affect transactions on communication network 30 may selectively be operated at the frequency of clock 50 in order to improve communication performance. Thus, as depicted in FIG. 4B, in response to receipt of a store request from processing logic 16, evaluate signal 76 of the latch-and-hold circuit 90 that samples the data driven by processing logic 16 is selectively set to the frequency of clock 50. The address and data driven by processing logic 16 is therefore sampled one full processor clock cycle earlier than in the prior art store operation illustrated in FIG. 4A.

Thereafter, evaluate signal 76 is set to alternate between active and inactive states at half of the frequency of clock 50. Thus, master control logic 70 utilizes four cycles of clock 50 for each of remaining states 1, 2, and 3 as in the prior art store operation depicted in FIG. 4A. However, because state 0 does not affect transactions on communication network 30 and is purely internal to master control logic 70, state 0 is accomplished in two cycles of clock 50, thereby permitting the store operation to be performed in four fewer processor clock cycles.

As has been described, the present invention provides an improved data processing system and method of data communication in a data processing system. According to the present invention, addresses and data are launched onto a communication network and read from the communication network in response to timing signals having individually selectable frequencies. Thus, the present invention permits complete control over the timing of communication transactions without any modification to conventional communication protocols. In addition, by independently clocking the master and snooper circuitry, constraints on the relative timing of mastering and snooping operations are eliminated, giving greater flexibility in performing communication transactions. The present invention further supports improved communication performance by selectively operating portions of the communication logic that do not affect transactions on the communication network at processor clock frequency.

While the invention has been particularly shown and described with reference to a preferred embodiment, it will be understood by those skilled in the art that various changes in form and detail may be made therein without departing from the spirit and scope of the invention.

What is claimed is:

1. A method of communicating data in a data processing system including a communication network, a communication controller, and a plurality of devices coupled to the communication network, at least one device among said plurality of devices including mastering circuitry and snooping circuitry, said method comprising:

generating a first timing signal having a first frequency and a second timing signal having a second frequency different from said first frequency utilizing the communication controller;

initiating communication transactions on said communication network utilizing said mastering circuitry, wherein said mastering circuitry operates in response to said first timing signal; and monitoring communication transactions on said communication network utilizing said snooping circuitry, wherein said snooping circuitry operates in response to said second timing signal, wherein said at least one device is a first device and said plurality of devices include a second device including mastering circuitry and snooping circuitry, said method further comprising:

generating a third timing signal having a third frequency that is selectable, wherein said snooping circuitry of said second device operates in response to said third timing signal; and in response to said mastering circuitry of said first device initiating a communication transaction on said communication network addressed to said second device, selecting said third frequency of said third timing signal to be equal to said first frequency of said first timing signal.

2. The method of claim 1, wherein individual cycles of said first timing signal have different durations.

3. The method of claim 1, and further comprising the step of dynamically selecting said first frequency and said second frequency.

4. A data processing system, comprising:
   a communication network;
   a communication controller that generates a first timing signal having a first frequency and a second timing signal having a second frequency different from said first frequency;
   a plurality of devices coupled to the communication network, at least one device among said plurality of devices including:
      mastering circuitry for initiating communication transactions on said communication network, wherein said mastering circuitry is operable in response to said first timing signal; and
      snooping circuitry for monitoring communication transactions on said communication network, wherein said snooping circuitry is operable in response to said second timing signal, wherein said at least one device is a first device and said plurality of devices include a second device that contains mastering circuitry and snooping circuitry;
   said communications controller generates a third timing signal having a third frequency that is selectable, wherein said snooping circuitry of said second device is operable in response to said third timing signal; and
   said communications controller selects said third frequency of said third timing signal to be equal to said first frequency of said first timing signal in response to said mastering circuitry of said first device initiating a communication transaction on said communication network addressed to said second device.

5. The data processing system of claim 4, wherein individual cycles of said first timing signal have different durations.

6. The data processing system of claim 4, wherein said communication controller dynamically selects said first frequency and said second frequency.

7. The method of claim 1, wherein initiating communication transactions on said communication network comprises transmitting an address and data in conjunction with a transaction ID.

8. The method of claim 1, wherein said at least one device is a first device and said plurality of devices include a second device including mastering circuitry and snooping circuitry, said method further comprising:

generating a third timing signal having a third frequency that is selectable, wherein said mastering circuitry of said second device operates in response to said third timing signal and said third frequency is different than said first frequency of said first timing signal.

9. The method of claim 1, wherein said mastering circuitry implements a state machine having a plurality of states, said method further comprising:

timing transitions between said plurality of states utilizing an evaluate signal having a frequency that is independent of frequencies of said first and second timing signals.

10. The method of claim 9, wherein said frequency of said evaluate signal can be selectively varied, said timing step comprising:

setting said frequency of said evaluate signal to a third frequency to time durations of states that do not affect a communication transaction on said communication network; and setting said frequency of said evaluate signal to a fourth frequency to time durations of states that affect a communication transaction on said communication network.

11. The data processing system of claim 4, wherein said mastering circuitry initiates communication transactions on said communication network by transmitting an address and data in conjunction with a transaction ID.

12. The data processing system of claim 4, wherein:

said at least one device is a first device and said plurality of devices include a second device including mastering circuitry and snooping circuitry;

said communication controller generates a third timing signal having a third frequency that is selectable, wherein said mastering circuitry of said second device operates in response to said third timing signal and said third frequency is different than said first frequency of said first timing signal.

13. The data processing system of claim 4, said mastering circuitry implementing a state machine having a plurality of states, wherein transitions between said plurality of states are timed utilizing an evaluate signal having a frequency that is independent of frequencies of said first and second timing signals.

14. The data processing system of claim 13, and further comprising a timing circuit that selectively varies the frequency of said evaluate signal, wherein the frequency of said evaluate signal is set to a third frequency to time durations of states that do not affect a communication transaction on said communication network and is set to a fourth frequency to time durations of states that affect a communication transaction on said communication network.

* * * * *